(12) United States Patent
Kouzu et al.

(10) Patent No.: US 7,178,330 B2
(45) Date of Patent: Feb. 20, 2007

(54) PRESSURE DETECTING APPARATUS HAVING SOLENOID VALVE AND PRESSURE SENSOR

(75) Inventors: Takahiro Kouzu, Kariya (JP); Tadashi Komiyama, Chiryu (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/075,762

(22) Filed: Mar. 10, 2005

(65) Prior Publication Data

US 2005/0204732 A1 Sep. 22, 2005

(30) Foreign Application Priority Data

Mar. 16, 2004 (JP) ............... 2004-075241

(51) Int. Cl.
*F01N 3/00* (2006.01)
(52) U.S. Cl. ............... 60/289; 60/277; 60/292; 60/293; 60/307; 137/312; 251/29.15; 73/118.1
(58) Field of Classification Search ......... 60/277, 60/289, 290, 291, 292, 293, 307; 137/312, 137/313, 557; 251/29.15; 277/318; 73/118.1, 73/40.5 R
See application file for complete search history.

(56) References Cited

U.S. PATENT DOCUMENTS

| | | | | |
|---|---|---|---|---|
| 5,852,929 A | * | 12/1998 | Kato et al. | 60/274 |
| 5,925,826 A | * | 7/1999 | Kodama et al. | 73/726 |
| 6,453,667 B1 | * | 9/2002 | Everingham | 60/289 |
| 6,742,537 B2 | * | 6/2004 | Martus et al. | 137/15.18 |
| 6,864,771 B2 | * | 3/2005 | Komiyama et al. | 335/220 |
| 6,978,600 B2 | * | 12/2005 | Hirooka | 60/289 |
| 7,032,375 B2 | * | 4/2006 | Tsuzuki et al. | 60/289 |

FOREIGN PATENT DOCUMENTS

| JP | 2002-260919 | 9/2002 |
|---|---|---|
| JP | 2002-272080 | 9/2002 |

* cited by examiner

*Primary Examiner*—Binh Q. Tran
(74) *Attorney, Agent, or Firm*—Nixon & Vanderhye PC

(57) ABSTRACT

A secondary air pressure detecting apparatus includes a solenoid valve and a pressure sensor. The solenoid valve defines a secondary air passage that introduces secondary air from the air pump into the exhaust system of an engine. The solenoid valve opens and closes the secondary air passage. The pressure sensor is integrally mounted to the solenoid valve to detect pressure of secondary air in the solenoid valve. The solenoid valve includes a coil assembly and magnetic members. The coil assembly includes a solenoid coil that generates magnetic force when the solenoid coil is energized. The magnetic members construct a magnetic circuit with the solenoid coil. The magnetic circuit is arranged outside of the secondary air passage. The pressure sensor is arranged on an opposite side of the secondary air passage with respect to the magnetic circuit.

13 Claims, 4 Drawing Sheets

PRESSURE DETECTING APPARATUS HAVING SOLENOID VALVE AND PRESSURE SENSOR

CROSS REFERENCE TO RELATED APPLICATIONS

This application is based on and incorporates herein by reference Japanese Patent Application No. 2004-75241 filed on Mar. 16, 2004.

FIELD OF THE INVENTION

The present invention relates to a secondary air pressure detecting apparatus that includes a solenoid secondary-air control valve, which is constructed of a solenoid valve integrated with a pressure sensor. The solenoid valve opens and closes a secondary air passage, through which secondary air is introduced from an air pump into a three-way catalyst, and the pressure sensor detects secondary air pressure in the solenoid valve.

More particularly, the present invention relates to a secondary air pressure detecting apparatus that detects a failure such as a disorder of an air pump and sticking of the solenoid valve in a closed position.

BACKGROUND OF THE INVENTION

Conventionally, when an internal combustion engine is started and exhaust gas emitted from the engine is low in temperature, an air pump is operated to generate secondary air. The secondary air is introduced into a three-way catalyst converter. Exhaust gas, which is emitted from the engine, is purified in the three-way catalyst converter, so that a three-way catalyst is activated. Secondary air is press-fed from the air pump, and is introduced into the three-way catalyst converter through a secondary air passage. A solenoid secondary-air control valve is provided in the secondary air passage.

The solenoid secondary-air control valve includes a solenoid valve and a check valve. The solenoid valve opens and closes the secondary air passage. The check valve restricts exhaust air emitted by the engine from flowing backward into the solenoid valve. As disclosed in JP-A-2002-260919 and JP-A-2002-272080, the solenoid valve is constructed of a valve body, a solenoid actuator, a coil spring, and the like. The valve body opens and closes an opening, i.e., a valve port that is formed in an intermediate portion of the secondary air passage. The solenoid actuator drives the valve body in the direction, in which the valve port is opened. The coil spring urges the valve in the direction, in which the valve port is closed.

A secondary air supply apparatus having the above structure includes a diagnostic function that determines a failure of the air pump and a failure of the solenoid valve. The diagnostic function determines a failure to be caused, when pressure of secondary air passing through the secondary air passage is out of a predetermined pressure range.

As shown in FIG. 4, a pressure sensor 101, which detects secondary air pressure, and a solenoid type air control valve, in which a solenoid valve 102 is integrated with a check valve 103, are components separated from each other. Accordingly, a mounting space, in which the secondary air supply apparatus is mounted, becomes large. Here, a pressure sensor 101 may be additionally provided to the solenoid secondary-air control valve disclosed in JP-A-2002-260919 and JP-A-2002-272080, so that the solenoid secondary-air control valve and the pressure sensor 101 may be produced as one assembly. The solenoid valve 102 includes a poppet valve 104, a solenoid coil 110, a stator core 111, a yoke 112, a moving core 113, and the like. The stator core 111 constructs a magnetic circuit with the solenoid coil 110. The solenoid coil 110 drives the poppet valve 104 in the direction, in which the poppet valve 104 opens a valve port. The check valve 103 includes a lead valve 114, a valve body 115, and a stopper 116.

However, when the pressure sensor 101 is additionally provided to the solenoid secondary-air control valve in the structure shown in FIG. 4, a sensor-mounting portion 106, in which the pressure sensor 101 is mounted, needs to be formed in the solenoid valve 102. Specifically, the sensor-mounting portion 106 needs to be formed in the inner space of the solenoid valve 102 and on the surface of the outer wall of a housing 105 of the solenoid valve 102. Accordingly, a housing, which is conventionally used, cannot be applied to this structure. Thus, the housing 105, which has the shape capable of mounting the sensor, needs to be manufactured. Furthermore, a pressure detecting male connector 121 and a solenoid-valve male connector 122 need to be provided to the solenoid valve 102. The pressure detecting male connector 121 includes a terminal that electrically connects the pressure sensor 101 with an engine control unit. The solenoid-valve male connector 122 electrically connects the solenoid valve 102 with the engine control unit.

Besides, a mounting space becomes large due to an additional mass of the pressure sensor 101. Accordingly, a pressure detecting female connector, which is provided on the side of the tip end of the vehicular wire harness, becomes hard to be mechanically connected with the pressure detecting male connector 121 in a narrow engine room. Besides, a solenoid-valve female connector, which is provided on the side of the tip end of the vehicular wire harness, becomes hard to be mechanically connected with the solenoid-valve male connector 122 in the narrow engine room. Additionally, a joint member such as a screw 107 needs to be provided for fixing the pressure sensor 101 to the sensor-mounting portion 106 of the housing 105 in the solenoid valve 102. Thus, when the pressure sensor 101 is additionally provided to the solenoid secondary-air control valve shown in FIG. 4, manufacturing cost may increase due to additional components and due to additional manufacturing processes.

In view of the foregoing problems, a pressure sensor, which includes a semiconductor pressure detecting element, may be integrated with a solenoid valve, which opens and closes a detection passage of fluid, to construct a pressure sensor integrated solenoid valve. As disclosed in JP-B2-3345306 (U.S. Pat. No. 5,925,826), the pressure sensor integrated solenoid valve may be applied to the secondary air supply apparatus. The pressure sensor is received in a sealed space that is constructed of a base and a cap in the pressure sensor integrated solenoid valve. The pressure sensor is arranged such that a semiconductor pressure detecting element partitions a standard pressure chamber and a fluid introducing chamber. A ceramic substrate covers the pressure sensor. An amplifier circuit, which amplifies a signal output from the pressure sensor, is provided to the inside of the ceramic substrate.

However, the detection passage of fluid extends through the inside the stator core, which constructs the magnetic circuit with the solenoid coil, in the structure of the pressure sensor integrated solenoid valve disclosed in U.S. Pat. No. 5,925,826. The semiconductor pressure detecting element is apt to cause a measurement error due to variation in temperature, accordingly, the semiconductor pressure detecting element is not suitable for detecting fluid in high temperature.

Additionally, foreign matters, which are contained in fluid passing through the detection fluid passage, may intrude into the fluid introducing chamber through a pressure introducing port and the detection passage of fluid. The foreign matters may adhere onto the amplifier circuit, which is exposed to the inside the fluid introducing chamber, and the amplifier circuit may output an abnormal signal. Furthermore, the pressure sensor is accommodated in the sealed space constructed of the base and the cap. Accordingly, a large number of sealing members such as O-rings and glue are needed for maintaining airtightness of the sealed space. As a result, manufacturing cost increases due to increase of the number of components and manufacturing processes.

Furthermore, in the structure of the pressure sensor integrated solenoid valve disclosed in U.S. Pat. No. 5,925,826, a terminal on the side of the pressure sensor is held by a terminal holder integrated with the cap, and another terminal on the side of the solenoid valve is held by a terminal holder integrated with the cap. Each terminal holder is fitted with a cylindrical male connector. The terminal holder, which holds the terminal on the side of the pressure sensor, is integrated with an end periphery of the cap. The end periphery of the cap is engaged with an engage groove, and is fixed with the base using glue. Accordingly, the position of the terminal on the side of the pressure sensor may be varied with respect to the position of the terminal on the side of the solenoid valve due to variation in dimension of the components. As a result, a female connector, which is provided to the tip end of a wire harness on the side of a control apparatus, may not be connected with the male connector.

SUMMARY OF THE INVENTION

In view of the foregoing problems, it is an object of the present invention to produce a secondary air pressure detecting apparatus that is capable of detecting pressure of secondary air in a solenoid valve while reducing detecting error by protecting a pressure sensor from heat transmitting from an exhaust system of an internal combustion engine.

It is another object of the present invention to produce a secondary air pressure detecting apparatus that is capable of restricting foreign matters from intruding into a pressure-detecting portion of the pressure sensor by trapping foreign matters through a pressure transmitting passage and restricting foreign matters from passing through the pressure transmitting passage, even when foreign matters intrude into the pressure transmitting passage through a detection passage of fluid of a stator core.

It is another object of the present invention to produce a secondary air pressure detecting apparatus that is capable of producing high air tightness without using a large number of components for maintaining airtightness.

It is another object of the present invention to produce a secondary air pressure detecting apparatus in which dimensions of connectors are capable of being stable.

According to the present invention, a secondary air pressure detecting apparatus detects pressure of secondary air. Secondary air is press-fed from an air pump to an exhaust system of an internal combustion engine. The secondary air pressure detecting apparatus includes a solenoid valve and a pressure sensor. The solenoid valve is arranged between the air pump and the exhaust system. The solenoid valve defines a secondary air passage that introduces secondary air from the air pump into the exhaust system. The solenoid valve is capable of opening and closing the secondary air passage. The pressure sensor is integrally mounted to the solenoid valve to detect pressure of secondary air in the solenoid valve. The solenoid valve includes a coil assembly and multiple magnetic members. The coil assembly includes a solenoid coil that generates magnetic force when the solenoid coil is energized. The magnetic members construct a magnetic circuit with the solenoid coil. The magnetic circuit is arranged outside of the secondary air passage. The pressure sensor is arranged on an opposite side of the secondary air passage with respect to the magnetic circuit.

The coil assembly includes a coil bobbin. The solenoid coil is wound around the outer periphery of the coil bobbin. The magnetic members include a moving core and a stator core. The moving core is capable of integrally moving with a valve body of the solenoid valve. The stator core is capable of attracting the moving core. The solenoid coil includes a coil portion and a pair of terminal-lead wires. The coil portion is constructed of a conductive wire that is wound around the outer periphery of the coil bobbin for multiple times. The pair of terminal-lead wires is pulled from the coil portion.

The stator core defines a pressure introducing port that communicates with the secondary air passage. The stator core and the coil bobbin define a pressure transmitting passage therebetween. The pressure transmitting passage communicates with the pressure introducing port. The coil assembly defines a pressure-introducing portion that introduces pressure of secondary air in the solenoid valve from the pressure introducing port through the pressure transmitting passage.

The coil bobbin is integrally formed with a protrusion that protrudes from an end of the coil bobbin into the pressure transmitting passage in order to form a labyrinth structure.

Alternatively, one of the coil bobbin and the stator core is integrally formed with a protrusion that protrudes to the other of the stator core and the coil bobbin. The pressure transmitting passage has an intermediate portion forming a labyrinth structure including the protrusion.

The stator core radially opposes to the coil bobbin. One of the stator core and the coil bobbin is concaved to the opposite side of the other of the coil bobbin and the stator core to define a recess. The pressure transmitting passage has an intermediate portion forming a debris trap including the recess.

BRIEF DESCRIPTION OF THE DRAWINGS

The above and other objects, features and advantages of the present invention will become more apparent from the following detailed description made with reference to the accompanying drawings. In the drawings.

Figure 1:
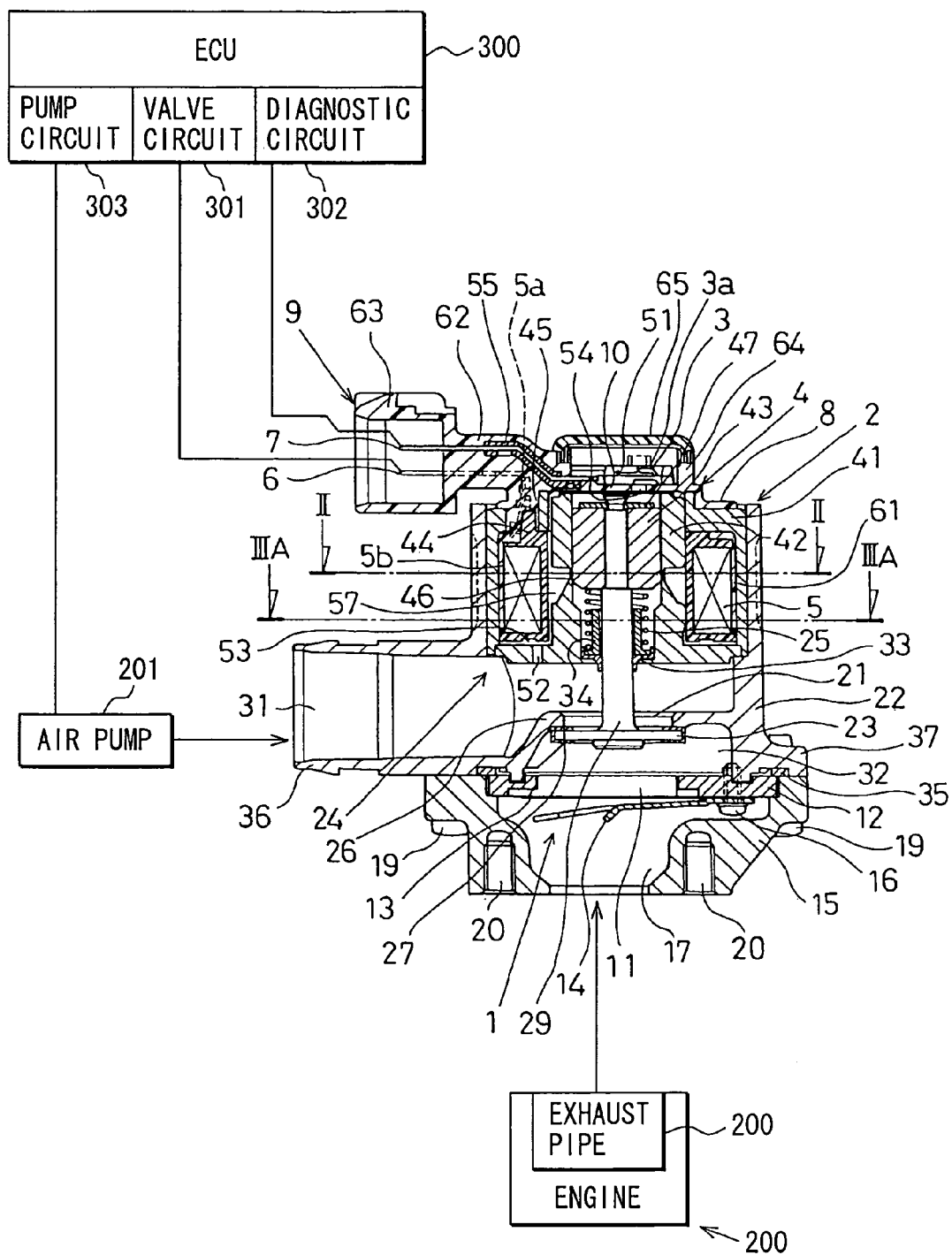
FIG. 1 is a partially cross-sectional side view showing a solenoid secondary-air control valve, in which a pressure sensor is integrated with a solenoid valve, according to a first embodiment of the present invention.

DETAILED DESCRIPTION OF PREFERRED EMBODIMENTS (First Embodiment)

As shown in FIGS. 1 to 3B, a secondary air supply apparatus includes an air pump 201, an electric motor (not shown), a secondary air passage, a solenoid secondary-air control valve, and an engine control unit (ECU, external circuit) 300. The air pump 201 generates secondary air. The electric motor rotates the air pump 201. The secondary air passage connects the air pump 201 with an exhaust system 202 such as an exhaust pipe 202 of an internal combustion engine 200. The solenoid secondary-air control valve is arranged in an intermediate portion of the secondary air passage, which introduces secondary air into a three-way catalyst converter, so that the solenoid secondary-air control valve opens and closes the secondary air passage. The ECU 300 electronically controls the electric motor and the solenoid secondary-air control valve in accordance with an operating condition of an engine 200.

The secondary air supply apparatus is connected between a secondary air supply pipe (not shown) of the secondary air supply apparatus and the exhaust pipe 202 of the engine 200. Secondary air generated by the air pump 201 is introduced into the three-way catalyst converter through the secondary air supply pipe to activate the three-way catalyst, when the engine 200 is started and exhaust gas is in low temperature.

The solenoid secondary-air control valve serves as a secondary air pressure detecting apparatus. The solenoid secondary-air control valve includes a check valve 1, a solenoid valve 2, and a pressure sensor 3. The check valve 1 allows air flowing in the forward direction, and restricts air from flowing in the backward direction. The solenoid valve 2 opens and closes a secondary air passage, through which secondary air, which is press-fed by the air pump 201, is introduced into an exhausting system, in particular, the three-way catalyst converter, of the engine 200. The pressure sensor 3 is integrally mounted to the solenoid valve 2.

The ECU 300 includes a microcomputer, a pump driving circuit (pump circuit) 303, a solenoid valve driving circuit (valve circuit) 301, and a failure diagnostic circuit (diagnostic circuit) 302. The microcomputer has a generally-known structure, which includes a CPU, a memory (ROM, RAM), an input circuit, an output circuit, a power supply, and the like. The CPU performs controls and calculations. The memory stores various kinds of programs and data. The pump circuit 303 energizes and controls the electric motor of the air pump 201, in accordance with an operating condition of the engine 200. The valve circuit 301 energizes and controls a solenoid coil 5 of a coil assembly 4 of the solenoid valve 2, in accordance with an operating condition of the engine 200. The diagnostic circuit 302 determines whether a failure of the air pump 201 and a failure (sticking in the closed condition) of the solenoid valve 2 are caused or not, in accordance with an electric signal output by the pressure sensor 3. Current is output from the valve circuit 301 to the solenoid coil 5 of the solenoid valve 2 via a pair of solenoid valve driving terminal (solenoid valve terminals, first terminals) 6 for operating the solenoid valve 2. That is, the solenoid valve terminals 6 are used for driving the solenoid valve 2.

An electric signal (secondary air pressure signal) is output from the pressure sensor 3 to the diagnostic circuit 302 via a pair of pressure detecting terminals (pressure sensor terminals, second terminals) 7. The pressure sensor terminals 7 are used for transmitting a pressure signal detected by the pressure sensor 3.

A female connector (not shown) is provided to an end of a wire harness (vehicular-wire harness) on the vehicular side, i.e., on the side of the ECU 300. A male connector 9 is integrally formed with a secondary resinous mold member (secondary mold member, terminal holding member) 8. The female connector is engaged with the male connector 9, so that the valve circuit 301 of the ECU 300 is electrically connected with the solenoid coil 5 of the solenoid valve 2, and the diagnostic circuit 302 of the ECU 300 is electrically connected with the pressure sensor 3. The vehicular-wire harness is constructed of at least four conductive wires. Each conductive wire is covered with a conformal tubing to be protected and electrically insulative. The at least four conductive wires are bound, and are respectively connected with female terminals that are formed in the female connector.

The check valve 1 restricts exhaust gas, which flows from an exhaust manifold of the engine 200 into the three-way catalyst converter through the exhaust pipe 202 of the engine 200, from flowing backward to the side of the air pump 201 and the solenoid valve 2. The check valve 1 includes a metallic plate 12, a lead valve 13, a lead stopper 14, and a valve case 15. The metallic plate 12 forms two air passage ports 11, through which secondary air passes. The lead valve 13 opens and closes the air passage ports 11. The lead stopper 14 restricts a degree of opening of the lead valve 13. The valve case 15 holds the metallic plate 12 of the check valve 1.

The metallic plate 12 is formed of a metallic material such as aluminum. The metallic plate 12 includes a frame portion formed in a substantially dual-square shape such that the frame portion defines the two air passage ports 11, through which secondary air passes. Specifically, the frame portion of the metallic plate 12 has a shape, in which two substantially squares are arranged to be adjacent to each other.

A sealing member formed of rubber or the like in a substantially dual-square shape is secured to the surface of the passage walls of the air passage ports 11 by printing or the like. The lead valve 13 is formed of a metallic material such as a blade spring. The lead valve 13 has a valve portion (free end portion) on one side and a supported portion (fixed end portion) on the other side. The valve portion of the lead valve 13 has a substantially dual-tongue shape, so that the valve portion is capable of opening and closing the two air passage ports 11. Specifically, the valve portion has two substantially plate-shaped members that are arranged to be adjacent to each other to form the substantially dual-tongue shape. The supported portion of the lead valve 13 is supported by the end face of a supporting portion of the metallic plate 12 on the side of downstream relative to airflow.

The lead stopper 14 is formed of a metallic plate. The lead stopper 14 has a stopper portion (free end portion) on one side and a supported portion (fixed end portion) on the other side. The stopper portion of the lead stopper 14 has a substantially dual-tongue shape, so that the stopper portion restricts a degree of opening of the lead valve 13. The supported portion of the lead stopper 14 is supported by the end face of the supported portion of the lead valve 13 on the side of downstream relative to airflow.

Two through holes are formed in all the supporting portion of the metallic plate 12, the supported portion of the lead valve 13 and the supported portion of the lead stopper 14. Screws 16 are screwed into the through holes, so that all the supporting portion of the metallic plate 12, the supported portion of the lead valve 13 and the supported portion of the lead stopper 14 are secured to the end face of the solenoid valve 2 on the lower side in FIG. 1.

A valve case 15 is die-cast of aluminum. The valve case 15 internally forms a secondary air passage 17. The secondary air passage 17 communicates with the exhaust pipe 202 on the upstream side of the three-way catalyst converter, so that secondary air generated by the air pump 201 is introduced into the three-way catalyst converter through the secondary air passage 17. The opening side of the valve housing 22 of the solenoid valve 2 on the lower end side in FIG. 1 has an engaging portion that is in a cylindrical shape. The valve case 15 has an engaged portion that is secured to the engaging portion of the valve housing 22 using multiple screws 19.

The lower end portion of the valve case 15 in FIG. 1 forms an outlet end portion of the secondary air passage of the solenoid secondary-air control valve. Multiple screw holes 20 are formed in the lower end portion of the valve case 15 in FIG. 1 such that fastening members such as bolts and screws are capable of being screwed into the screw holes 20. The lower end portion of the valve case 15 in FIG. 1 is secured to a mounting stay (not shown), which is provided to the exhaust pipe 202 of the engine 200, using the fastening members.

The solenoid valve 2 is constructed of the valve housing 22, a poppet valve (valve body) 23, a solenoid actuator 24, and a coil spring (biasing means) 25. The valve housing 22 is integrally connected with the valve case 15. The valve housing 22 internally forms an air passage 21, through which secondary air flows. The poppet valve 23 opens and closes the air passage 21 formed in the valve housing 22. The solenoid actuator 24 operates the poppet valve 23 in the direction, in which the poppet valve 23 opens the air passage 21. The coil spring (biasing means) 25 urges the poppet valve 23 in the direction, in which the poppet valve 23 closes the air passage 21.

The valve housing 22 is die-cast of aluminum. A cylindrical sidewall portion, which accommodates the solenoid actuator 24, and a cylindrical pipe coupling 36 are integrally formed with the valve housing 22. The pipe coupling 36 extends from the lower end portion of the sidewall portion of the valve housing 22 to the left side in FIG. 1.

The cylindrical pipe coupling 36 forms an inlet end portion of the secondary air passage, which is defined in the solenoid secondary-air control valve. The air pump 201 has a discharge port that is connected with the cylindrical pipe coupling 36 via a secondary piping. A frame-shaped wall (partition wall) 26 is integrally formed with the lower end of the sidewall portion of the valve housing 22 in FIG. 1. The frame-shaped wall 26 partitions the secondary air passage into the upstream side thereof and the downstream side thereof.

The frame-shaped wall 26 has an opening in the center thereof, so that the opening of the frame-shaped wall 26 forms the air passage 21 that defines a valve port of the solenoid valve 2. A cylindrical valve seat 27 is provided to the periphery of the air passage 21 located on the lower end side of the frame-shaped wall 26 in FIG. 1. The poppet valve 23 seats onto the valve seat 27.

The secondary air passage formed in the valve housing 22 of the solenoid valve 2 is constructed of secondary air passages 31, 32 and the like. The secondary air passage 31 is formed on the upstream side of the frame-shaped wall 26 with respect to secondary air flow. The secondary air passage 32 is formed on the downstream side of the frame-shaped wall 26 with respect to secondary air flow. The secondary air passage 31 communicates with the secondary air passage 32 through the air passage (valve port) 21 of the solenoid valve 2. The secondary air passage 32 communicates with the secondary air passage 17 through the two air passage ports (valve port) 11 of the check valve 1. The secondary air passage 17 is formed in the valve case 15 of the check valve 1.

The poppet valve 23 has a valve portion that is in a disc-shape. A rubber elastic member is secured onto the outer periphery of the valve portion of the poppet valve 23 using printing or the like. The poppet valve 23 is capable of reciprocating in the axial direction integrally with a valve shaft 29.

The poppet valve 23 seats onto the valve seat 27 provided to the frame-shaped wall 26 of the valve housing 22, so that the poppet valve 23 closes the air passage (valve port) 21. The poppet valve 23 lifts from the valve seat 27, so that the poppet valve 23 opens the air passage (valve port) 21.

An annular-shaped seal rubber 33 is provided onto the outer periphery of a middle portion of the valve shaft 29 to restrict foreign matters from intruding into a sliding portion of the valve shaft 29. A plate presser 34 is provided to the upper side of the seal rubber 33 in FIG. 1 to serve as a stopper that defines the maximum lift of the moving core 43 and the poppet valve 23. The coil spring 25 is supported on the outer peripheral side of a large diameter portion of the valve shaft 29 and a cylindrical portion (spring inner diameter guide) of the plate presser 34. One end portion of the coil spring 25 hooks to a collar portion of the plate presser 34, and the other end portion of the coil spring 25 hooks to the moving core 43.

A seal rubber 35 restricts secondary air from leaking through a connecting portion between the valve case 15 of the check valve 1 and the valve housing 22 of the solenoid valve 2. A mounting stay 37 connects the valve housing 22 with the valve case 15 of the check valve 1.

The solenoid actuator 24 is press-inserted into the inner periphery of the sidewall portion of the valve housing 22 of the solenoid valve 2. The solenoid actuator 24 serves as a valve body driving means that operates the poppet valve 23 in the direction, in which the poppet valve 23 closes the air passage 21.

The solenoid actuator 24 includes a yoke 41, a stator core 42, the moving core 43, and the coil assembly (solenoid coil device) 4 of the solenoid valve. The stator core 42 is in a substantially cylindrical shape that internally forms a coil accommodating portion with the yoke 41 therebetween. The coil accommodating portion is in a substantially cylindrical shape. The moving core 43 moves both the poppet valve 23 and the valve shaft 29 integrally in the axial direction. Multiple magnetic members such as the yoke 41, the stator core 42, and the moving core 43 construct a magnetic circuit.

The magnetic circuit, which is constructed of the solenoid coil 5, the yoke 41, the stator core 42, and the moving core 43, is arranged on the outside of the secondary air passages 31, 32 in the solenoid valve 2. Specifically, The magnetic circuit is arranged on the upper side in FIG. 1 with respect to the secondary air passages 31, 32 in the solenoid valve 2. The secondary air passages 31, 32 are formed in the valve housing 22 of the solenoid valve 2.

The yoke 41 and the stator core 42 of the magnetic members are fixed iron cores. Each of the yoke 41 and the stator core 42 has a cylindrical portion. The radially outer periphery of the stator core 42 and the radially inner periphery of the yoke 41 form the coil accommodating portion, which is in the substantially cylindrical shape, therebetween. The coil accommodating portion accommodates the solenoid coil 5 and a coil bobbin 44.

The upper portion of the cylindrical portion of the yoke 41 in FIG. 1 forms an annular ceiling portion that covers the opening side of the cylindrical portion of the yoke 41 on the upper side in FIG. 1. The ceiling portion of the yoke 41 forms a lead wire hole 45, through which a pair of terminal-lead wires 5a of the solenoid valve 5 is pulled.

The lower portion of the stator core 42 in FIG. 1 forms a flange portion that is in an annular shape. The flange portion of the stator core 42 forms a passage wall of the secondary air passage 31. The radially outer periphery of the cylindrical portion of the stator core 42 forms a recess, in which a thin wall portion 46 is formed. The cross sectional area of a magnetic passage is reduced in the thin wall portion 46, so that the thin wall portion 46 restricts magnetic performance from being degraded due to excessive flow of magnetic flux. Thereby, when the yoke 41, the stator core 42, and the moving core 43 are magnetized, the moving core 43 is capable of linearly moving in the axial direction of the moving core 43 toward an attracting portion of the stator core 42, while the moving core 43 is restricted from axially fluctuating.

The moving core 43 is a fixed iron core, which is in a substantially cylindrical shape, into which the upper end portion (small diameter portion) of the valve shaft 29 of the poppet valve 23 in FIG. 1 is fitted. The moving core 43 has a latching portion that latches onto a step portion formed between the large diameter portion and the small diameter portion of the valve shaft 29. A washer 47, which is in an annular shape, is attached to a portion between the upper end of the moving core 43 in FIG. 1 and the collar portion of the valve shaft 29.

The outer diameter of the collar portion of the valve shaft 29 is greater than the inner diameter of the through hole of the moving core 43. The valve shaft 29 is inserted into the through hole of the stator core 42 from the lower side in FIG. 1, after inserting the moving core 43 into the sliding hole of the stator core 42 from the upper side of FIG. 1. Subsequently, the collar portion of the valve shaft 29 is crimped, so that the moving core 43 is inserted between the collar portion of the valve shaft 29 and the step portion of the valve shaft 29. Thus, the moving core 43 and the poppet valve 23 are capable of integrally moving.

The coil assembly 4 is constructed of the solenoid coil 5, the pair of solenoid valve terminals 6, and the secondary molded member 8. The solenoid coil 5 is wound around the outer periphery of the coil bobbin (primary resinous mold member, resinous bobbin) 44. The pair of solenoid valve terminals 6 electrically connects with the pair of the terminal-lead wires 5a of the solenoid coil 5. The secondary molded member 8 covers the outer peripheries of both the solenoid coil 5 and the coil bobbin 44. The secondary molded member 8 supports both the pair of solenoid valve terminals 6 and the pair of pressure sensor terminals 7.

The solenoid coil 5 is constructed in such a manner that a conductive wire, which is coated with an insulative material, is wound around the coil bobbin 44. The solenoid coil 5 generates magnetic force by being energized, so that the solenoid coil 5 magnetizes the magnetic members such as the yoke 41, the stator core 42, and the moving core 43. Thereby, the solenoid coil 5 moves the poppet valve 23 of the solenoid valve 2 in the direction, in which the poppet valve 23 opens the air passage 21.

The solenoid coil 5 includes a coil portion 5b, which is wound around the radially outer periphery of the coil bobbin 44, and the pair of terminal-lead wires 5a. The pair of terminal-lead wires 5a is pulled from the coil portion 5b of the solenoid coil 5.

The secondary molded member 8 is arranged closely to the outer periphery of the coil portion 5b of the solenoid coil 5. The coil bobbin 44 is a primary resinous mold member that is formed of electrically insulative thermoplastic resin such as poly butylene terephthalate (PBT). The coil bobbin 44 is fixed to the secondary molded member 8, and is accommodated within the coil accommodating portion, which is in the substantially cylindrical shape, formed between the radially outer periphery of the stator core 42 and the radially inner periphery of the yoke 41. The coil bobbin 44 is constructed of a cylindrical portion, which is in a substantially cylindrical shape, and collar portions, which are in a substantially annular shape. The coil portion 5b of the solenoid coil 5 is wound around the radially outer periphery of the cylindrical portion of the coil bobbin 44. The collar portions are provided to both axial ends of the cylindrical portion of the coil bobbin 44. The secondary molded member 8 is arranged closely to both the radially outer periphery and the upper end of the collar portion of the coil bobbin 44, which is located on the upper side in FIG. 1.

Each of the pair of the solenoid valve terminals 6 is a plate-shaped conductive member that is formed of a metallic plate. The solenoid valve terminal 6 is covered with and supported by the secondary molded member 8, so that the solenoid valve terminal 6 is protected. One side of the solenoid valve terminal 6 is inserted into and is electrically connected with the female connector provided to the end of the vehicular-wire harness. The other side of the solenoid valve terminal 6 is electrically connected with each of the terminal-lead wires 5a of the solenoid coil 5 by welding. A claw portion is provided to the other side of the solenoid valve terminal 6 such that the claw portion is crimped and fixed to the end of the terminal of the lead wire of the solenoid coil 5, for example.

The pressure sensor 3 includes a pressure-detecting portion (sensor unit) 3a and the pair of pressure sensor terminals 7. The pressure-detecting portion 3a of the pressure sensor 3 converts pressure of secondary air in the secondary air passage 31 of the solenoid valve 2. The pressure sensor terminals 7 are electrically connected with a silicon substrate (circuit) 51. The flange portion of the stator core 42 forms a pressure introducing port 52, through which secondary air pressure in the solenoid valve 2 is transmitted. The pressure sensor 3 is mounted on the secondary molded member 8, which is arranged closely to the coil assembly 4 of the solenoid valve 2. The pressure sensor 3 is arranged on the opposite side of the secondary air passages 31, 32 with respect to the magnetic circuit in the solenoid valve 2. The pressure sensor 3 is arranged on the upper side of both the secondary air passages 31, 32 and the magnetic circuit in FIG. 1.

A semiconductor pressure sensor and the pressure-detecting portion 3a are mounted on the silicon substrate 51. The semiconductor pressure sensor is constructed of a piezoresistive element or the like. The semiconductor pressure sensor converts pressure of secondary air, which is introduced into a pressure-introducing portion 54 through a pressure transmitting passage 53 in the solenoid valve 2, into an electric signal (secondary air pressure signal). The pressure-detecting portion 3a is an amplifying circuit or the like. The pressure-detecting portion 3a amplifies the electric signal, i.e., the secondary air pressure signal output by the semiconductor pressure sensor. The semiconductor pressure sensor uses piezo resistive effect in a single crystal semiconductor for detecting pressure. In particular, in this embodiment, a strain gauge is formed on the semiconductor pressure sensor through a diffusion process or an ion implantation process.

Each of the pair of the pressure sensor terminals 7 is a plate-shaped conductive member that is formed of a metallic plate. The pressure sensor terminal 7 is covered with and supported by the secondary molded member 8, so that the pressure sensor terminal 7 is protected. One side of the pressure sensor terminal 7 is inserted into and is electrically connected with the female connector provided to the end of the vehicular-wire harness. The other side of the pressure sensor terminal 7 is electrically connected with each of output terminals of the silicon substrate 51 of the pressure sensor 3 by welding, soldering or the like. In this embodiment, each pressure sensor terminal 7 is covered with a terminal holder (protecting tube) 55 to maintain an electrically insulative distance between the pair of the pressure sensor terminals 7. The terminal holder 55 is formed of an electrically insulative resin to be in a substantially H-shape.

The pressure transmitting passage 53 is a gap formed between the coil bobbin 44 of the coil assembly 4 and the stator sore 42. Secondary air in the secondary air passages 31 of the solenoid valve 2 is introduced from the pressure introducing port 52 into the pressure-introducing portion 54 of the coil assembly 4 through the pressure transmitting passage 53.

Figure 3A:
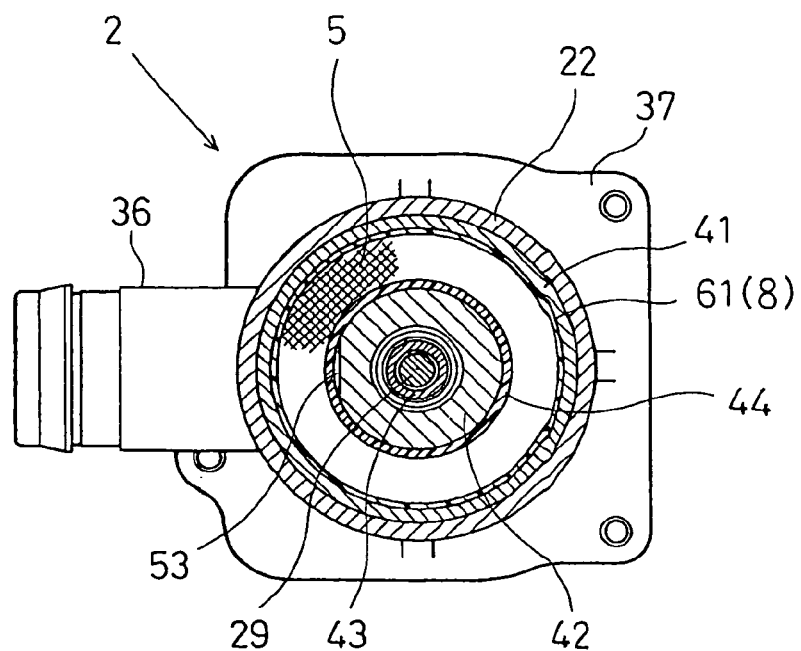
FIG. 3A is a partially cross-sectional top view taken along the line IIIA—IIIA in FIG. 1.
Figure 3B:
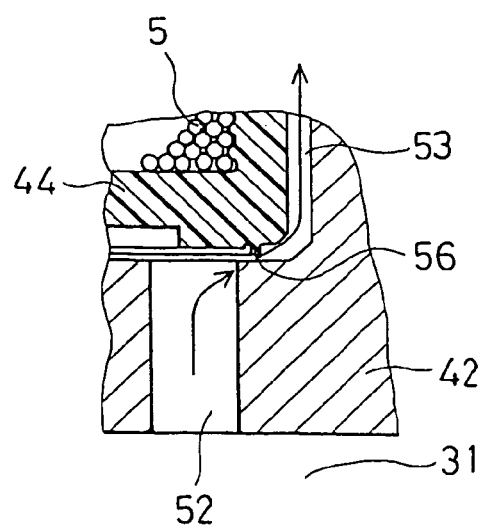
FIG. 3B is an enlarged cross-sectional side view showing a pressure introducing port of a stator core, according to the first embodiment.

As shown in FIG. 3B, a protrusion 56 protrudes from the lower end of the lower collar portion of the coil bobbin 44 in FIG. 3B, and the protrusion 56 protrudes into the pressure transmitting passage 53. Thereby, the protrusion 56 forms a labyrinth structure (labyrinth seal) in the intermediate portion of the pressure transmitting passage 53. The labyrinth structure restricts foreign matters such as debris from passing through the pressure transmitting passage 53, even when the foreign matters intrude into the pressure transmitting passage 53 from the pressure introducing port 52. Thereby, as shown in FIG. 1, foreign matters can be restricted from intruding into the pressure-introducing portion 54 of the coil assembly 4 through the pressure transmitting passage 53.

A debris trap (recess) 57 is formed in an intermediate portion of the pressure transmitting passage 53 using the recess that is formed in the radially outer periphery of the cylindrical portion of the stator core 42. That is, the debris trap 57 is formed around the thin wall portion 46 formed in the cylindrical portion of the stator core 42. The debris trap 57 catches foreign matters, and the foreign matters are accumulates in the debris trap 57, even when the foreign matters intrude into the pressure transmitting passage 53 from the pressure introducing port 52. Thereby, foreign matters can be restricted from intruding into the pressure-introducing portion 54 of the coil assembly 4 through the debris trap 57.

The secondary molded member 8 of the coil assembly 4 of the solenoid valve 2 is formed of electrically insulative thermoplastic resin such as poly butylene terephthalate (PBT). When the secondary molded member 8 is secondarily molded, all of the solenoid coil 5, the pair of the solenoid valve terminals 6, the pair of the pressure sensor terminals 7, and the coil bobbin 44 are insert-molded inside the secondary molded member 8.

The secondary molded member 8 is integrally formed with the male connector 9, a sensor-mounting portion 10, and a cylindrical portion 61. The male connector 9 mechanically connects with the female connecter provided to the end of the vehicular-wire harness. The pressure sensor 3 is mounted onto the sensor-mounting portion 10. The lead wire hole 45, which is formed in the upper end of the yoke 41 in FIG. 1, communicates with the coil accommodating portion formed in the cylindrical portion 61. The cylindrical portion 61 liquid tightly covers the radially outer periphery of the coil portion 5b of the solenoid coil 5 and a fusing portion, i.e., welded portion.

The male connector 9 is constructed of a terminal holder 62, a connector shell 63, and the like. The terminal holder 62 entirely supports the solenoid valve terminals 6 and the pressure sensor terminals 7. The connector shell 63, which is in a substantially polygonal cylindrical shape, protrudes from the terminal holder 62 in the left direction in FIG. 1.

The terminal holder 62 is integrally formed with the cylindrical portion 61 of the secondary molded member 8 and the sensor-mounting portion 10. The terminal holder 62 is arranged between the cylindrical portion 61 and the sensor-mounting portion 10 such that the terminal holder 62 connects the cylindrical portion 61 with the sensor-mounting portion 10.

Each tip end of the one side of both the solenoid valve terminals 6 and the pressure sensor terminals 7 protrudes from the left end of the terminal holder 62 in FIG. 1, i.e., the surface of the bottom wall of the connector shell 63. The female connecter provided to the end of the vehicular-wire harness is inserted into the connector shell 63 of the male connector 9, so that the valve circuit 301 of the ECU 300 is electrically connected with the solenoid coil 5 of the solenoid valve 2, and the diagnostic circuit 302 of the ECU 300 is electrically connected with the pressure sensor 3.

The sensor-mounting portion 10 is integrally formed of resin with the right portion of the male connector 9 in FIG. 1. The sensor-mounting portion 10 is formed in one of a substantially circular shape and a substantially polygonal shape. The sensor-mounting portion 10 forms a communicating passage (not shown) that internally communicates the pressure sensor 3 with the pressure-introducing portion 54. A sensor case 64 extends from the sensor-mounting portion 10 upward in FIG. 1, such that the sensor case 64 surrounds the pressure sensor 3. The sensor case 64 is formed in one of a substantially cylindrical shape and a substantially polygonal cylindrical shape.

The opening side of the sensor case 64 is airtightly covered with a sensor cover 65. The sensor cover 65 forms an inner space with the sensor-mounting portion 10 therebetween on the upper side of the pressure sensor 3 in FIG. 1 such that the inner space surrounds the pressure sensor 3.

The sensor cover 65 is formed of electrically insulative thermoplastic resin such as poly butylene terephthalate (PBT). The sensor cover 65 has an engaged portion that engages with an engaging portion provided to the opening side of the sensor case 64. The sensor cover 65 is assembled to the opening side of the sensor case 64 using a rivet or a screw. Alternatively, the sensor cover 65 is welded with the sensor case 64 by laser welding or the like, after the engaged portion of the sensor cover 65 is engaged with the engaging portion of the sensor case 64, so that the engaged portion of the sensor cover 65 is airtightly connected with the engaging portion of the sensor case 64.

Next, a manufacturing process of the coil assembly 4 of the solenoid valve 2 is described in reference to FIGS. 1 to 3B.

The coil bobbin 44 of the coil assembly 4 is molded in a primary resinous molding dies (not shown) that is constructed of a fixed die and a movable die. The molding surface of the fixed die and the molding surface of the movable die form a cavity, which corresponds to the shape of the product of the coil bobbin 44, therebetween.

Next, a primary molding process of the coil assembly 4 of the solenoid valve 2 is described.

Heated molten thermoplastic resin (primary molten resin) is injected into at least one gate formed in the primary resinous molding dies, so that the primary molten resin is filled in the cavity formed between the fixed die and the movable die. Subsequently, the primary molten resin filled in the cavity of the primary resinous molding dies is taken out, and is cooled to be solidified. Alternatively, cooling medium such as cooling water is circulated around the cavity of the primary resinous molding dies, so that the primary molten resin filled in the cavity is cooled to be solidified. Thus, the coil bobbin 44, which includes the substantially cylindrical portion and the substantially annular collar portions, is primarily molded.

The protrusion 56 is integrally molded simultaneously with the coil bobbin 44 such that the protrusion 56 protrudes from the lower end of the collar portion of the coil bobbin 44 in FIG. 1 to the side of the flange portion of the stator core 42. That is, the protrusion 56 protrudes into the pressure transmitting passage 53.

Next, a winding process, in which the coil portion 5b of the solenoid coil 5 is wound around the coil bobbin 44, is described.

The other ends of the solenoid valve terminals 6 are inserted into and assembled to at least one of the collar portions of the coil bobbin 44. Subsequently, conductive wire, which is coated with the insulative material, is wound around the portion between the collar portions of the coil bobbin 44, i.e., wound around the radially outer periphery of the cylindrical portion of the coil bobbin 44 for a predetermined times. Thus, the coil portion of the solenoid coil 5 is manufactured. Subsequently, the terminal-lead wires 5a of the solenoid coil 5 are connected with the other sides of the solenoid valve terminals 6 using a connecting method such as welding.

In this embodiment, the claw portion is provided to the other sides of the solenoid valve terminals 6. Thereby, the claw portions of the solenoid valve terminals 6 is crimped and fixed to the ends of the terminal-lead wires 5a of the solenoid coil 5. Subsequently, electrodes are pushed onto the claw portions, and electricity is applied to the claw portions, so that insulative coating, which covers the terminal-lead wires 5a, is removed by heat generated by applying electricity. Thus, the terminal-lead wires 5a are electrically connected, i.e., fused with the other sides of the solenoid valve terminals 6. In this embodiment, the fused portion is covered with and supported by the secondary molded member 8 as well as the solenoid valve terminals 6, so that the fused portion and the solenoid valve terminals 6 are protected.

Next, a secondary molding process of the secondary molded member 8 of the solenoid valve 2 is described.

The secondary molded member 8 of the coil assembly 4 is molded in a secondary resinous molding dies (not shown) that is constructed of a fixed die and a movable die. The molding surface of the fixed die and the molding surface of the movable die form a cavity, which corresponds to the shape of the product of the secondary molded member 8, therebetween.

The solenoid coil 5, the solenoid valve terminals 6, and the coil bobbin 44 are inserted into the cavity of the secondary molded member 8. The pressure sensor terminals 7, which are coated with the terminal holder 55, are inserted into the cavity of the secondary molded member 8, while maintaining a predetermined insulative distance with respective to the solenoid valve terminals 6. The solenoid coil 5, the solenoid valve terminals 6, the pressure sensor terminals 7, and the coil bobbin 44 are arranged at a predetermined position in the cavity of the secondary molded member 8, and are supported by an insert member supporting portion provided to at least one of the fixed die and the movable die.

At least one of the tip ends of the one ends of the solenoid valve terminals 6, which are to be exposed in the connector shell 63, is fixed at a predetermined position. At least one of the tip ends of the one ends of the pressure sensor terminals 7, which are to be exposed in the connector shell 63, is fixed at a predetermined position. At least one of the rear ends of the other ends of the pressure sensor terminals 7, which are to be exposed in the sensor case 64, is fixed at a predetermined position.

The solenoid coil 5, the solenoid valve terminals 6, the pressure sensor terminals 7, and the coil bobbin 44 are secondarily molded such that the solenoid coil 5, the solenoid valve terminals 6, the pressure sensor terminals 7 are protected from fluid such as water.

Heated molten thermoplastic resin (secondary molten resin) is injected into at least one gate formed in the secondary resinous molding dies, so that the secondary molten resin is filled in the cavity formed between the fixed die and the movable die. The secondary molten resin flows around the cavity such that the secondary molten resin surrounds the whole of the radially outer periphery of the coil portion 5b of the solenoid coil 5, and surrounds the fusing portion that is between the terminal-lead wires 5a of the solenoid coil 5 and the solenoid valve terminals 6. Besides, the secondary molten resin surrounds the supported portion of the solenoid valve terminals 6 excluding the one ends thereof, and surrounds the supported portion of the pressure sensor terminals 7 excluding both the tip ends of the one ends thereof and the rear ends of the other ends thereof.

Subsequently, the secondary molten resin filled in the cavity of the secondary resinous molding dies is taken out, and is cooled to be solidified. Alternatively, cooling medium such as cooling water is circulated around the cavity of the secondary resinous molding dies, so that the secondary molten resin filled in the cavity is cooled to be solidified. Thus, the secondary molded member 8, which includes the male connector 9, the sensor-mounting portion 10, the cylindrical portion 61 and the like, is secondarily molded.

That is, the male connector 9, which includes the terminal holder 62 and the connector shell 63, and the sensor-mounting portion 10, which includes the sensor case 64, are integrally molded of resin with the secondary molded member 8 of the coil assembly 4 of the solenoid valve 2. Simultaneously, the inserted components such as the solenoid coil 5, the solenoid valve terminals 6, the pressure sensor terminals 7, and the coil bobbin 44 are insert-molded in the secondary molded member 8 formed of thermoplastic resin. The yoke 41, which forms the magnetic circuit with the solenoid coil 5, may be insert-molded in the secondary molded member 8 with the inserted components.

Figure 2:
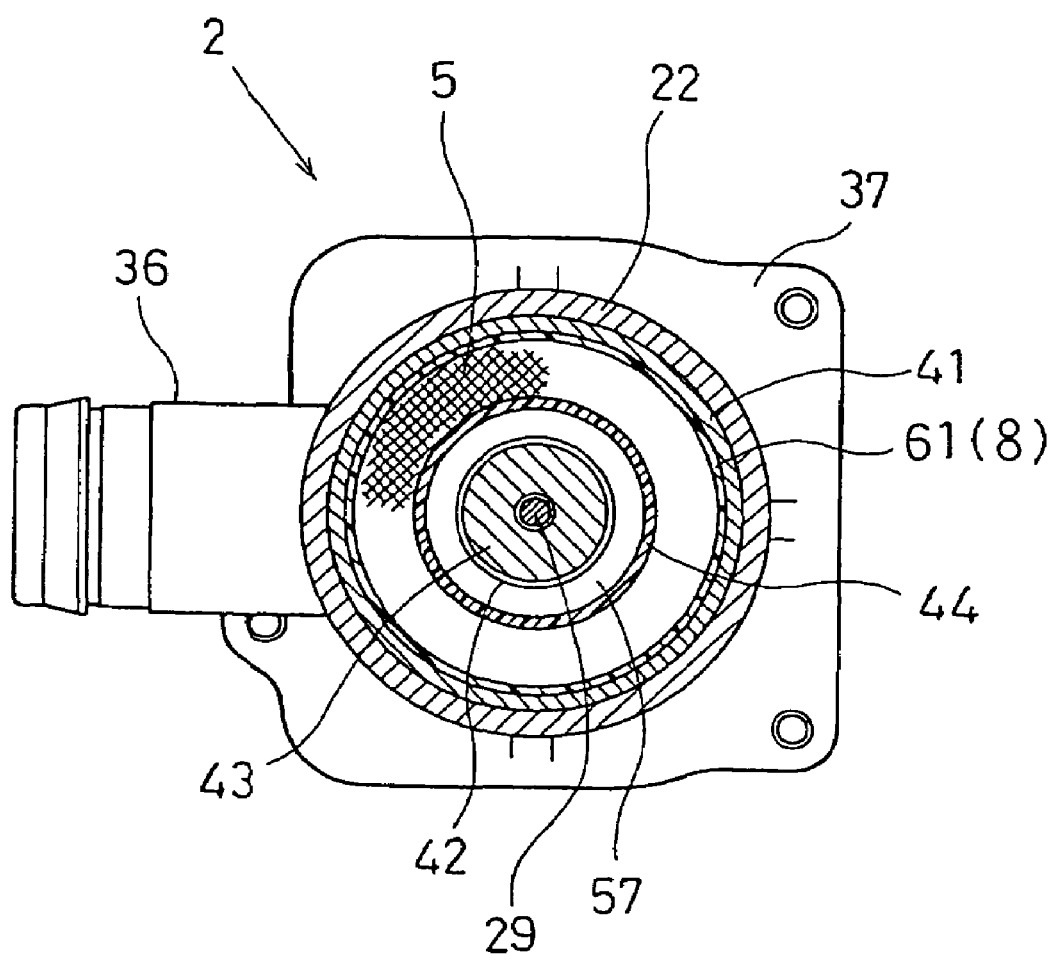
FIG. 2 is a partially cross-sectional top view taken along the line II—II in FIG. 1, according to the first embodiment.

Next, a diagnostic method of a failure of the secondary air supply apparatus using the secondary air pressure detecting apparatus is described in reference to FIGS. 1 to 3.

Exhaust gas emitted from the engine 200 includes three kinds of toxic substances containing carbon oxide (CO), hydrocarbon (HC), and nitrogen oxide (NOx). A vehicle such as an automobile has a three-way catalyst converter to transfer the three kinds of toxic substances into nontoxic substance by chemical reaction.

However, the chemical reaction cannot be performed in the three-way catalyst, when an air fuel ratio of combustion gas in the engine 200 is not maintained at the theoretical air fuel ratio (15:1). Therefore, air fuel ratio needs to be maintained at the theoretical air fuel ratio. Besides, the three-way catalyst cannot be properly operated, when temperature of exhaust gas is low, e.g., less than about 350° C., immediately after starting the engine 200. Accordingly, when the engine 200 is started, and temperature of exhaust gas is low, the air pump 201 is operated, so that secondary air is generated. The secondary air is introduced into the three-way catalyst converter to activate the three-way catalyst in order to, in particular, transfer hydrocarbon (HC) into nontoxic water (H2O) by oxidization.

The ECU 300 applies pump driving electricity to the electric motor of the air pump 201 via the pump circuit 303, when temperature of exhaust gas is low, e.g., immediately after starting the engine 200. Thereby, secondary air is press-fed by the air pump 201. The ECU 300 applies solenoid valve driving electricity to the solenoid coil 5 of the solenoid valve 2 via the valve circuit 301, the vehicular-wire harness, the female connecter provided to the end of the vehicular-wire harness, the male connector 9, and the solenoid valve terminals 6.

Thereby, the magnetic members such as the yoke 41, the stator core 42, and the moving core 43, which form the magnetic circuit with the solenoid coil 5, are magnetized. The moving core 43 is attracted to the attracting portion of the stator core 42, so that the moving core 43 moves downward in FIG. 1. As the moving core 43 moves downward, the poppet valve 23, which is secured to the moving core 43, moves downward in FIG. 1 against resilient force of the coil spring 25. Thus, the poppet valve 23 lifts from the valve seat 27, so that the poppet valve 23 opens the air passage 21.

Secondary air flows from the discharge port of the air pump 201 into the solenoid valve 2 through the secondary air supply pipe. The secondary air passes through the secondary air passage 31 formed in the valve housing 22, the air passage 21, and the air passage 32. Subsequently, the secondary air flows into the two air passage ports 11, which are formed in the frame portion of the metallic plate 12 of the check valve 1. The frame portion is in the substantially dual-square shape.

The substantially dual-tongue shaped valve portion of the lead valve 13 is bent downward in FIG. 1 by difference between pressure of air in the two air passage ports 11 and pressure of air in the secondary air passage 17. The valve portion makes contact with the stopper portion of the lead stopper 14, so that the valve portion opens the two air passage ports 11. Thereby, secondary air flowing into the two air passage ports 11 passes through the secondary air passage 17, and the secondary air is introduced into the exhaust pipe 202 of the engine 200 on the upstream side of the three-way catalyst converter. Thus, the secondary air is introduced into the three-way catalyst converter.

Therefore, secondary air generated by operating the air pump 201 is introduced into the three-way catalyst converter, so that oxygen (O2) is burned and the three-way catalyst is activated, even when temperature of exhaust gas is low immediately after starting of the engine 200. In particular, hydrocarbon (HC) becomes nontoxic water (H2O) by oxidization, so that an amount of emission of hydrocarbon to the atmosphere can be reduced.

Secondary air pressure in the solenoid valve 2 is transmitted from the pressure introducing port 52 of the stator core 42. The pressure introducing port 52 partially forms the passage wall of the secondary air passage 31 formed in the valve housing 22. The secondary air pressure is transmitted from the pressure introducing port 52 into the pressure-introducing portion 54 of the coil assembly 4 through the pressure transmitting passage 53.

The semiconductor sensor of the silicon substrate 51, which is mounted on the sensor-mounting portion 10 of the secondary molded member 8, converts secondary air pressure into the electric signal, i.e., the secondary air pressure signal, and the semiconductor sensor outputs the secondary air pressure signal. The secondary air pressure is transmitted into the pressure-introducing portion 54 through the pressure transmitting passage 53 in the solenoid valve 2.

The amplifying circuit, which is mounted on the silicon substrate 51 of the pressure sensor 3, amplifies the secondary air pressure signal that is output from the semiconductor sensor. The secondary air pressure signal, which is amplified by the amplifying circuit, is transmitted to the diagnostic circuit 302 of the ECU 300 via the pressure sensor terminals 7, the male connector 9, the female connector, and the vehicular-wire harness.

When the secondary air pressure signal (output voltage) output from the pressure sensor 3 is in a predetermined voltage range, the diagnostic circuit 302 of the ECU 300 determines the air pump 201 to be normally operated, and the diagnostic circuit 302 determines the poppet valve 23 of the solenoid valve 2 to be normally opened.

On the contrary, the secondary air pressure signal (output voltage) output from the pressure sensor 3 may be out of the predetermined voltage range, i.e., the secondary air pressure signal is equal to or less than a predetermined amount or is equal to or greater than a predetermined amount. In this case, the diagnostic circuit 302 of the ECU 300 determines the air pump 201 to be in a failure condition, such as a malfunction, or the diagnostic circuit 302 determines the poppet valve 23 of the solenoid valve 2 to be in a failure condition, such as sticking in the closed condition.

When the diagnostic circuit 302 of the ECU 300 determines a failure of the air pump 201 or the solenoid valve 2, a failure flag may be turned ON and an indicator lamp (warning lamp) may be turned ON to notify the abnormality of the solenoid secondary-air control valve to a driver. When the failure flag is turned ON, supply of electricity to the electric motor and the solenoid coil 5 of the solenoid valve 2 may be stopped.

The above structure of the secondary air pressure detecting apparatus includes the solenoid secondary-air control valve, in which the pressure sensor 3 is integrally mounted to the solenoid valve 2.

Specifically, the sensor-mounting portion 10, to which the pressure sensor 3 is integrally mounted to the solenoid valve 2, is provided integrally to the secondary molded member 8 of the coil assembly 4 of the solenoid valve 2. Thereby, the sensor-mounting portion need not to be additionally provided to the sidewall of the valve housing 22.

Besides, the sensor-mounting portion 10, onto which the pressure-detecting portion 3a of the pressure sensor 3 is mounted, is integrally formed with the secondary molded member 8, so that the pressure sensor 3 can be integrally mounted onto the solenoid valve 2.

Figure 4:
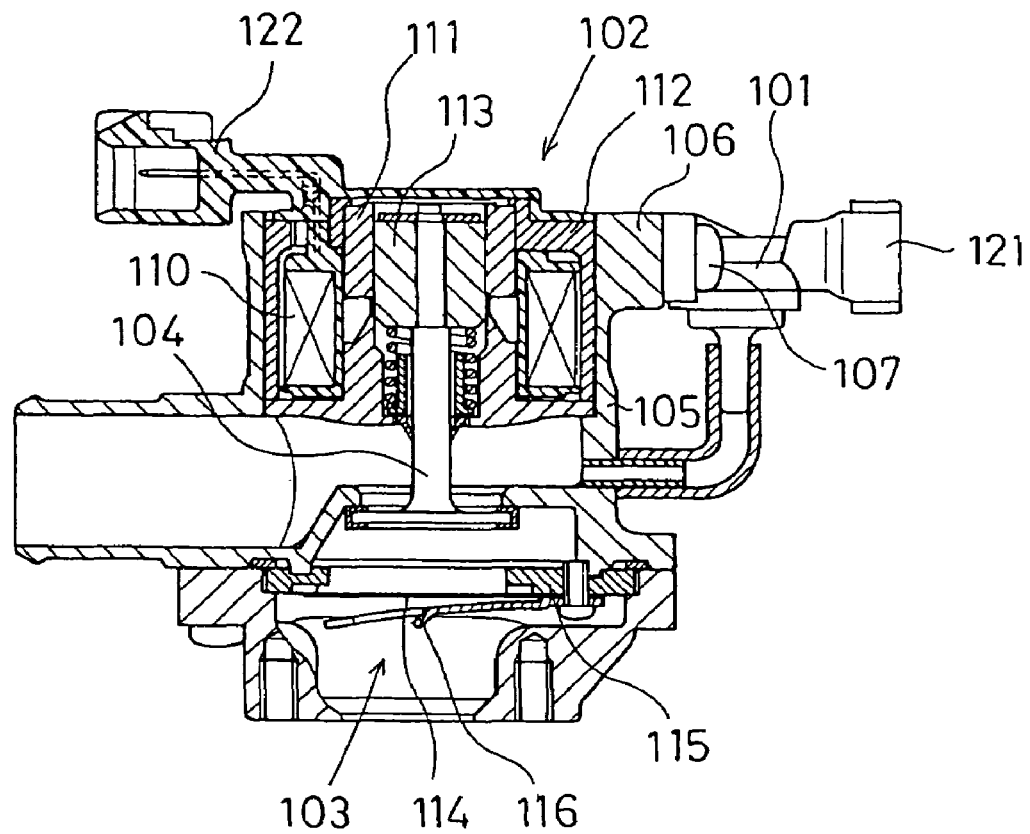
FIG. 4 is a partially cross-sectional side view showing a solenoid secondary-air control valve, in which a pressure sensor is additionally provided to a solenoid valve, according to a related art.

Furthermore, a pressure sensor need not to be additionally provided to the outside of the sidewall of the valve housing 22 on the right side in FIG. 1, compared with the structure shown in FIG. 4, in which the pressure sensor 101 is additionally provided to the solenoid secondary-air control valve.

Therefore, the solenoid secondary-air control valve, in which the pressure sensor 3 is integrally mounted to the solenoid valve 2, is restricted from being jumboized. Thus, a mounting space, in which the secondary air pressure detecting apparatus is arranged, can be reduced, so that the solenoid secondary-air control valve is capable of being easily mounted in a narrow engine room.

The solenoid coil 5 and the magnetic members such as the yoke 41, the stator core 42, and the moving core 43, which form the magnetic circuit with the solenoid coil 5, are arranged on the outside of the secondary air passages 31, 32 in the solenoid valve 2. Additionally, the pressure sensor 3, which detects pressure of secondary air in the solenoid valve 2, is arranged on the opposite side of the secondary air passages 31, 32 with respect to the magnetic circuits. Exhaust gas, which is high in temperature, flows through the exhaust pipe 202 of the engine 200, and heat is apt to be transmitted from the exhaust pipe 202 to the pressure sensor 3. However, in the above structure, the pressure-detecting portion 3a of the pressure sensor 3 is protected from the heat transmitted from the exhaust pipe 202. Therefore, pressure of secondary air in the solenoid valve 2 can be precisely detected while detection error is reduced, and a costly temperature compensating circuit need not to be additionally provided.

The pressure transmitting passage 53 is formed in the solenoid actuator 24 of the solenoid valve 2. More specifically, the pressure transmitting passage 53 is formed between the radially inner periphery of the coil bobbin 44 of the coil assembly 4 and the radially outer periphery of the stator core 42, which constructs the magnetic circuit with the solenoid coil 5, in the solenoid valve 2. The pressure transmitting passage 53 introduces pressure of secondary air from the pressure introducing port 52, which is formed in the stator core 42, into the pressure-introducing portion 54 of the coil assembly 4 in the solenoid valve 2.

The recess is formed on side of the radially outer periphery of the cylindrical portion of the stator core 42, so that the thin wall portion 46 is formed in the stator core 42. Thereby, the space formed between the intermediate part of the magnetic circuit of the stator core 42 having the concaved shape, i.e., the thin wall portion 46 and the coil bobbin 44 defines an air pocket, i.e., the debris trap 57. Even when debris intrudes into the pressure transmitting passage 53 from the pressure introducing port 52 of the stator core 42, the debris trap 57 captures the debris, and the debris accumulates in the debris trap 57. Thereby, debris can be restricted from flowing into the pressure-introducing portion 54 of the coil assembly 4 through the debris trap 57, so that the pressure-detecting portion 3a of the pressure sensor 3 can be protected from being adhered with debris. Therefore, the amplifying circuit is restricted from transmitting an abnormal signal, so that reliability of the detection signal of secondary air pressure detected by the pressure sensor 3 can be maintained.

Furthermore, pulsation of pressure transmitted from the pressure introducing port 52 into the pressure transmitting passage 53 can be damped through the debris trap 57 that has a structure, in which cross sectional area of the passage is increased in the pressure transmitting passage 53.

The protrusion 56 protrudes from the lower end of the lower collar portion of the coil bobbin 44 in FIG. 3B, and the protrusion 56 protrudes into the pressure transmitting passage 53. Thereby, the protrusion 56 forms the labyrinth structure (labyrinth seal) with the outer peripheries of the protrusion 56. Debris is hard to pass through the labyrinth structure in the pressure transmitting passage 53, even when the foreign matters intrude into the pressure transmitting passage 53 from the pressure introducing port 52 of the stator core 42. Thereby, debris can be restricted from intruding into the pressure-introducing portion 54 of the coil assembly 4, so that the pressure-detecting portion 3a of the pressure sensor 3 can be protected from being adhered with debris. Therefore, the amplifying circuit is restricted from transmitting an abnormal signal, so that reliability of the detection signal of secondary air pressure detected by the pressure sensor 3 can be maintained.

The solenoid valve terminals 6 and the pressure sensor terminals 7 are insert-molded in the secondary molded member 8 of the coil assembly 4 in the solenoid valve 2, so that the solenoid valve terminals 6 and the pressure sensor terminals 7 are integrally supported in the terminal holder 62 of the secondary molded member 8.

Besides, the male connector 9 and the sensor-mounting portion 10 are integrally formed with the secondary molded member 8. Specifically, the male connector 9 having the connector shell 63, which connects with the female connecter provided to the end of the vehicular-wire harness, and the sensor case 64, which is in the shape surrounding the pressure sensor 3, are integrally formed with the secondary molded member 8. The sensor cover 65 air tightly closes the opening side of the sensor case 64. Thus, high airtightness can be maintained, and the dimension of the connector can be stabled.

The tip end (first connector terminal) of the one end of the solenoid valve terminal 6, the tip end (second connector terminal) of the one end of the pressure sensor terminal 7, and the male connector 9 having the connector shell 63 are integrally formed with the secondary molded member 8 of the coil assembly 4 in the solenoid valve 2. Thereby, the opening of the connector shell 63 of the male connector 9 is capable of being freely determined in direction. In the above structure, the direction, in which the pipe coupling 36 of the valve housing 22 of the solenoid valve 2 protrudes, substantially coincides with the direction of the opening of the connector shell 63 of the male connector 9. However, the direction, in which the pipe coupling 36 of the valve housing 22 of the solenoid valve 2 protrudes, may be different from the direction of the opening of the connector shell 63 of the male connector 9. Even in this structure, the solenoid actuator 24 can be provided to the sidewall of the valve housing 22 in the solenoid valve 2.

The solenoid valve terminal 6 and the pressure sensor terminal 7 are integrally supported in the terminal holder 62 of the male connector 9. The tip ends of the vehicular-wire harness, which electrically connects the valve circuit 301 of the ECU 300 with the solenoid coil 5 of the solenoid valve 2, and the tip ends of the vehicular-wire harness, which electrically connects the diagnostic circuit 302 of the ECU 300 with the pressure sensor 3, are bound. The tip ends of the vehicular-wire harness, which are bound, are connected with the one female connector. The one female connector is connected with, i.e., plugged with the male connector 9. By the above manufacturing process including binding and connecting of the vehicular-wire harness and the connectors, both electrical connection between the valve circuit 301 and the solenoid coil 5 of the solenoid valve 2 and electronic connection between the diagnostic circuit 302 and the pressure sensor 3 can be completed in the above structure.

Thereby, the vehicular-wire harness including at least four conductive wires, which are bound together, are capable of being quickly connected with the pair of the solenoid valve terminals 6 and the pair of the pressure sensor terminals 7. Besides, arrangement of the vehicular-wire harness in the engine room, i.e., wiring work of the vehicular-wire harness becomes easy.

In the above structure, the engaged portion of the sensor cover 65, which is integrally formed with the sensor-mounting portion 10 of the secondary molded member 8, is inserted into the engaging portion of the sensor case 64. Subsequently, the sensor cover 65 is welded with the sensor case 64 by fixing means such as laser welding, so that the engaging portion of the sensor case 64 is airtightly connected with the engaged portion of the sensor cover 65. Thereby, the sealed space can be easily formed between the sensor case 64 and the sensor cover 65 to accommodate the pressure sensor 3.

The sealed space formed between the sensor case 64 and the sensor cover 65 is capable of being maintained in an airtight condition relative to the outside of the sensor case 64 and the sensor cover 65. Thereby, the pressure-detecting portion 3a of the pressure sensor 3 can be isolated from the outside, so that reliability of an electric signal output from the pressure-detecting portion 3a of the pressure sensor 3 can be enhanced. That is, pressure of secondary air can be stably detected, so that reliability of the solenoid valve 2 can be enhanced. As a result, a sealing member such as an O-ring and glue need not for maintaining airtightness of the sealed space. Therefore, the number of components and manufacturing processes decrease, and manufacturing cost can be reduced.

Glue such as silicone type glue may be painted around the engaged portion of the sensor cover 65, which is inserted into the engaging portion of the sensor case 64, to airtightly connect between the engaged portion of the sensor cover 65 and the engaging portion of the sensor case 6.

(Variation)

In the above structure, the yoke 41, the stator core 42, and the moving core 43 are provided as the magnetic members that construct the magnetic circuit with the solenoid coil 5. However, the yoke 41 may be excluded from the magnetic members, and the stator core 42 and the moving core 43 may construct the magnetic circuit with the solenoid coil 5 in the solenoid valve 2. The stator core 42 may be divided into two pieces.

In the above structure, the semiconductor pressure sensor is used as the pressure sensor 3. However, a pressure sensor, which is constructed of a primary transducer and a secondary transducer, such as a differential transformer pressure sensor, a strain gauge pressure sensor, an electrical capacitance pressure sensor may be used. The primary transducer generates displacement or strain that is in proportion to pressure of secondary air in the solenoid valve 2. The secondary transducer transfers the displacement or the strain into an electric signal.

Here, a semiconductor pressure sensor has a structure, in which a primary transducer and a secondary transducer are integral, so that the semiconductor pressure sensor has a simple structure dissimilarly to a strain gauge pressure sensor that includes both a glued layer and a base film layer.

Furthermore, a primary transducing resilient member is a diamond-structured covalent crystal, so that the primary transducing resilient member hardly exhibit hysteresis.

A heat resistive thermoplastic resin such as polyphenylene sulfide (PPS), polyamide resin (PA), polypropylene (PP), and polyether imide (PEI) may be used as a resinous material formed to be the secondary molded member 8 of the coil assembly 4 in the solenoid valve 2, the coil bobbin 44 and the sensor cover 65.

A resin compound material, which is made of heated molten resin including filler, may be used as a resinous material formed to be the secondary molded member 8, the coil bobbin 44 and the sensor cover 65. The heated molten resin may be molten thermoplastic resin or the like. The filler may be grass fiber, carbon fiber, aramid fiber, boron fiber, or the like. The resin compound material may be made of resin mixed with additive or resin including additive. The resin compound material may be poly butylene terephthalate including grass fiber by 30%.

The number of the solenoid valve driving terminals (solenoid valve terminals, first terminals) 6 may be equal to or greater than three. The number of the pressure detecting terminals (pressure sensor terminals, second terminals) 7 may be equal to or greater than three. The number of the terminal-lead wires 5a may be equal to or greater than three.

A protrusion 56 may be integrally provided to one of the coil bobbin 44 and the stator core 42 such that the protrusion 56 protrudes toward the other of the stator core 42 and the coil bobbin 44, so that a labyrinth structure including the protrusion 56 is formed in an intermediate portion of the pressure transmitting passage 53. The protrusion 56 may be integrally provided to both the coil bobbin 44 and the stator core 42.

A recess 57 may be formed in one of the stator core 42 and the coil bobbin 44. Specifically, one of the stator core 42 and the coil bobbin 44 is concaved to the opposite side of the other of the coil bobbin 44 and the stator core 42 to form the recess 57. Here, the stator core 42 and the coil bobbin 44 are radially opposed from each other. That is, one of the stator core 42 and the coil bobbin 44 is radially concaved inwardly. Thus, a debris trap including the recess 57 is formed in an intermediate portion of the pressure transmitting passage 53. The recess 57 may be formed in both the stator core 42 and the coil bobbin 44. Various modifications and alternations may be diversely made to the above embodiments without departing from the spirit of the present invention.

What is claimed is:

1. A secondary air pressure detecting apparatus that detects pressure of secondary air, secondary air press-fed from an air pump to an exhaust system of an internal combustion engine, the secondary air pressure detecting apparatus comprising:
    a solenoid valve that is arranged between the air pump and the exhaust system, the solenoid valve defining a secondary air passage that introduces secondary air from the air pump into the exhaust system, the solenoid valve capable of opening and closing the secondary air passage; and
    a pressure sensor that is integrally mounted to the solenoid valve to detect pressure of secondary air in the solenoid valve,
    wherein the solenoid valve includes a coil assembly and a plurality of magnetic members,
    the coil assembly includes a solenoid coil that generates magnetic force when the solenoid coil is energized,
    the plurality of magnetic members constructs a magnetic circuit with the solenoid coil,
    the magnetic circuit is arranged outside of the secondary air passage, and
    the magnetic circuit is located between the pressure sensor and the secondary air passage.

2. The secondary air pressure detecting apparatus according to claim 1,
    wherein the coil assembly includes a coil bobbin, the solenoid coil wound around an outer periphery of the coil bobbin,
    the plurality of the magnetic members includes a moving core and a stator core, the moving core is capable of integrally moving with a valve body of the solenoid valve, the stator core is capable of attracting the moving core, the solenoid coil includes a coil portion and a pair of terminal-lead wires, the coil portion is constructed of a conductive wire that is wound around an outer periphery of the coil bobbin for a plurality of times, and the pair of terminal-lead wires is pulled from the coil portion.

3. A secondary air pressure detecting apparatus that detects pressure of secondary air, secondary air press-fed from an air pump to an exhaust system of an internal combustion engine, the secondary air pressure detecting apparatus comprising:

a solenoid valve that is arranged between the air pump and the exhaust system, the solenoid valve defining a secondary air passage that introduces secondary air from the air pump into the exhaust system, the solenoid valve capable of opening and closing the secondary air passage;

a pressure sensor that is integrally mounted to the solenoid valve to detect pressure of secondary air in the solenoid valve, wherein the solenoid valve includes a coil assembly and a plurality of magnetic members, the coil assembly includes a solenoid coil that generates magnetic force when the solenoid coil is energized, the plurality of magnetic members constructs a magnetic circuit with the solenoid coil, the magnetic circuit is arranged outside of the secondary air passage, the pressure sensor is arranged on an opposite side of the secondary air passage with respect to the magnetic circuit, the coil assembly includes a coil bobbin, the solenoid coil wound around an outer periphery of the coil bobbin, the plurality of the magnetic members includes a moving core and a stator core, the moving core is capable of integrally moving with a valve body of the solenoid valve, the stator core is capable of attracting the moving core, the solenoid coil includes a coil portion and a pair of terminal-lead wires, the coil portion is constructed of a conductive wire that is wound around an outer periphery of the coil bobbin for a plurality of times, the pair of terminal-lead wires is pulled from the coil portion, the coil assembly includes a coil bobbin, the solenoid coil wound around an outer periphery of the coil bobbin, the plurality of the magnetic members includes a moving core and a stator core, the moving core is capable of integrally moving with a valve body of the solenoid valve, the stator core is capable of attracting the moving core, the solenoid coil includes a coil portion and a pair of terminal-lead wires, the coil portion is constructed of a conductive wire that is wound around an outer periphery of the coil bobbin for a plurality of times, the pair of terminal-lead wires is pulled from the coil portion, the stator core defines a pressure introducing port that communicates with the secondary air passage, the stator core and the coil bobbin define a pressure transmitting passage therebetween, the pressure transmitting passage communicating with the pressure introducing port, and the coil assembly defines a pressure-introducing portion that introduces pressure of secondary air in the solenoid valve from the pressure introducing port through the pressure transmitting passage.

4. The secondary air pressure detecting apparatus according to claim 3, wherein the coil bobbin is integrally formed with a protrusion that protrudes from an end of the coil bobbin into the pressure transmitting passage in order to form a labyrinth structure.

5. The secondary air pressure detecting apparatus according to claim 3, wherein one of the coil bobbin and the stator core is integrally formed with a protrusion that protrudes to the other of the stator core and the coil bobbin, and the pressure transmitting passage has an intermediate portion forming a labyrinth structure including the protrusion.

6. The secondary air pressure detecting apparatus according to claim 3, wherein the stator core radially opposes to the coil bobbin, one of the stator core and the coil bobbin is concaved to an opposite side of the other of the coil bobbin and the stator core to define a recess, and the pressure transmitting passage has an intermediate portion forming a debris trap including the recess.

7. A secondary air pressure detecting apparatus that detects pressure of secondary air, secondary air press-fed from an air pump to an exhaust system of an internal combustion engine, the secondary air pressure detecting apparatus comprising:

a solenoid valve that is arranged between the air pump and the exhaust system, the solenoid valve defining a secondary air passage that introduces secondary air from the air pump into the exhaust system, the solenoid valve capable of opening and closing the secondary air passage;

a pressure sensor that is integrally mounted to the solenoid valve to detect pressure of secondary air in the solenoid valve, wherein the solenoid valve includes a coil assembly and a plurality of magnetic members, the coil assembly includes a solenoid coil that generates magnetic force when the solenoid coil is energized, the plurality of magnetic members constructs a magnetic circuit with the solenoid coil, the pressure sensor is arranged on an opposite side of the secondary air passage with respect to the magnetic circuit, the solenoid coil includes a pair of terminal-lead wires that is pulled from the solenoid coil, the coil assembly includes a pair of first terminals that is connected with the pair of terminal-lead wires, the pressure sensor includes a pressure-detecting portion and a pair of second terminals, the pressure-detecting portion converts pressure of secondary air in the solenoid valve into an electric signal, the pressure-detecting portion outputting the electric signal, and the pair of the second terminals is connected with the pressure-detecting portion.

8. The secondary air pressure detecting apparatus according to claim 7, wherein the coil assembly includes a terminal holder that holds the pair of the first terminals and the pair of the second terminals, the terminal holder includes a connector shell and a sensor-mounting portion, the pair of the first terminals and the pair of the second terminals are electrically connected with an external circuit via the connector shell, the connector shell being in a substantially cylindrical shape, and the pressure-detecting portion is mounted to the sensor-mounting portion.

9. The secondary air pressure detecting apparatus according to claim 8, wherein the coil assembly includes a sensor case and a sensor cover, the sensor case is in a substantially cylindrical shape, the sensor case surrounding the sensor-mounting portion, the sensor case is integrally formed with the sensor-mounting portion, the sensor cover airtightly closes an opening side of the sensor case, and the sensor cover is assembled to the opening side of the sensor case after the pressure-detecting portion is mounted to the sensor-mounting portion.

10. The secondary air pressure detecting apparatus according to claim 8, wherein the external circuit is an engine control unit, the engine control unit includes a solenoid valve driving circuit and a failure diagnostic circuit, the solenoid valve driving circuit energizes and controls the solenoid coil in accordance with an operating condition of the internal combustion engine, and the failure diagnostic circuit determines whether at least one of a failure of the air pump and a failure of the solenoid valve is caused or not, in accordance with an electric signal output by the pressure-detecting portion.

11. A secondary air pressure detecting apparatus that detects pressure of secondary air, secondary air press-fed from an air pump to an exhaust system of an internal combustion engine, the secondary air pressure detecting apparatus comprising:

a solenoid valve that is arranged between the air pump and the exhaust system, the solenoid valve defining a secondary air passage that introduces secondary air from the air pump into the exhaust system, the solenoid valve capable of opening and closing the secondary air passage;

a pressure sensor that is integrally mounted to the solenoid valve to detect pressure of secondary air in the solenoid valve, wherein the solenoid valve includes a coil assembly and a plurality of magnetic members, the coil assembly includes a solenoid coil that generates magnetic force when the solenoid coil is energized, the plurality of magnetic members constructs a magnetic circuit with the solenoid coil, the pressure sensor is arranged on an opposite side of the secondary air passage with respect to the magnetic circuit, the solenoid valve includes a housing, the housing defining the secondary air passage, the housing includes a frame-shaped wall, the frame-shaped wall partitions the secondary air passage into an upstream side of the secondary air passage and a downstream side of the secondary air passage, the frame-shaped wall defines an air passage, the solenoid valve includes a valve body that is capable of opening and closing the air passage, the housing defines an inner space that accommodates a solenoid actuator and a biasing means, the solenoid actuator operates the valve body in a direction, in which the valve body opens the air passage, and the biasing means biases the valve body in a direction, in which the valve body closes the air passage.

12. The secondary air pressure detecting apparatus according to claim 11, wherein the biasing means is a coil spring.

13. A secondary air pressure detecting apparatus that detects pressure of secondary air, secondary air press-fed from an air pump to an exhaust system of an internal combustion engine, the secondary air pressure detecting apparatus comprising:

a solenoid valve that is arranged between the air pump and the exhaust system, the solenoid valve defining a secondary air passage that introduces secondary air from the air pump into the exhaust system, the solenoid valve capable of opening and closing the secondary air passage; and a pressure sensor that is integrally mounted to the solenoid valve to detect pressure of secondary air in the solenoid valve, wherein the solenoid valve includes a coil assembly and a plurality of magnetic members, the coil assembly includes a solenoid coil that generates magnetic force when the solenoid coil is energized, the plurality of magnetic members constructs a magnetic circuit with the solenoid coil, the magnetic circuit is arranged outside of the secondary air passage, the magnetic circuit is interposed between the pressure sensor and the secondary air passage, and the pressure sensor communicates with the secondary air passage through the magnetic circuit.

* * * * *